Aug. 7, 1951 H. R. CLARKE ET AL 2,563,581

FINGER-WHEEL OPERATED CALL TRANSMITTER HAVING
LARGER NUMBER PLATE THAN FINGER WHEEL

Filed April 17, 1948 3 Sheets-Sheet 1

INVENTORS - H. R. CLARKE
L. A. ELMER
A. HERCKMANS
O. L. WALTER

BY J. MacDonald
ATTORNEY

INVENTORS - H. R. CLARKE
L. A. ELMER
A. HERCKMANS
O. L. WALTER
BY J. MacDonald
ATTORNEY INVENTORS - H. R. CLARKE
L. A. ELMER
A. HERCKMANS
O. L. WALTER
BY J. MacDonald
ATTORNEY Patented Aug. 7, 1951 2,563,581

UNITED STATES PATENT OFFICE 2,563,581

FINGER-WHEEL OPERATED CALL TRANSMITTER HAVING LARGER NUMBER PLATE THAN FINGER WHEEL

Harry R. Clarke, Milburn, Lloyd A. Elmer, Summit, Alfred Herckmans, Springfield, and Orville L. Walter, Maplewood, N. J., assignors to Bell Telephone Laboratories, Incorporated, New York, N. Y., a corporation of New York Application April 17, 1948, Serial No. 21,618

5 Claims. (Cl. 179—90)

This invention relates to telephone call transmitters and more particularly to telephone call transmitters of the finger-wheel operated type.

The object of the present invention is the provision of a call transmitter of the type above-referred to embodying a small number of simple operating parts which are rugged in construction and so combined as to be readily accessible for adjustment and repair.

Another object of the invention is the provision of a call transmitter of the finger-wheel operated type in which the wind-up or clockwise rotation of the finger wheel causes the collective operation of a pair of contact springs to prevent the transmission of impulses and on its return to normal prevents the collective operation of said springs to permit a series of impulses to be transmitted.

A further object of the invention is the provision of a call transmitter of the finger-wheel operated type in which the number plate is of a substantially larger diameter than the finger wheel, is concavo-convex in cross section and has its indicia located beyond the periphery of the finger wheel and in concentric rows which are concentric with the finger wheel.

The call transmitter of this invention is of the finger-wheel type and utilizes a number plate having a diameter substantially larger in diameter than the finger wheel. The number plate is constructed of molded material, is substantially concavo-convex in cross section, and has the indicia thereon arranged in concentric rows which are concentric with the finger wheel and located beyond the periphery of the finger wheel.

The operating mechanism of the transmitter is mounted on a suitable plate located in the rear of the number plate and comprises a driving shaft operatively connected to the finger wheel and having associated therewith suitable gears for driving a pulsing mechanism for operating suitable contact springs for transmitting electrical impulses when the finger wheel is restored to its normal position under the influence of a coil spring located in a recess in the supporting plate housing and operatively connected to the driving shaft so that it is tensioned by the wind-up or clockwise rotation of the finger wheel and a speed regulating device for controlling the operation of the finger wheel during its return to normal, is operatively connected by suitable gears to the driving shaft. The contact springs operated by the pulsing mechanism to send out a predetermined number of electrical impulses, depending upon the amount of rotation of the finger wheel, are operated collectively on the wind-up or clockwise direction of the finger wheel and are thereby prevented from sending out any electrical impulses. Upon the return of the finger wheel to its normal position under the influence of a suitable driving spring, means associated therewith prevents the collective operation of the springs thereby permitting a series of electrical impulses to be transmitted.

Figure 1:
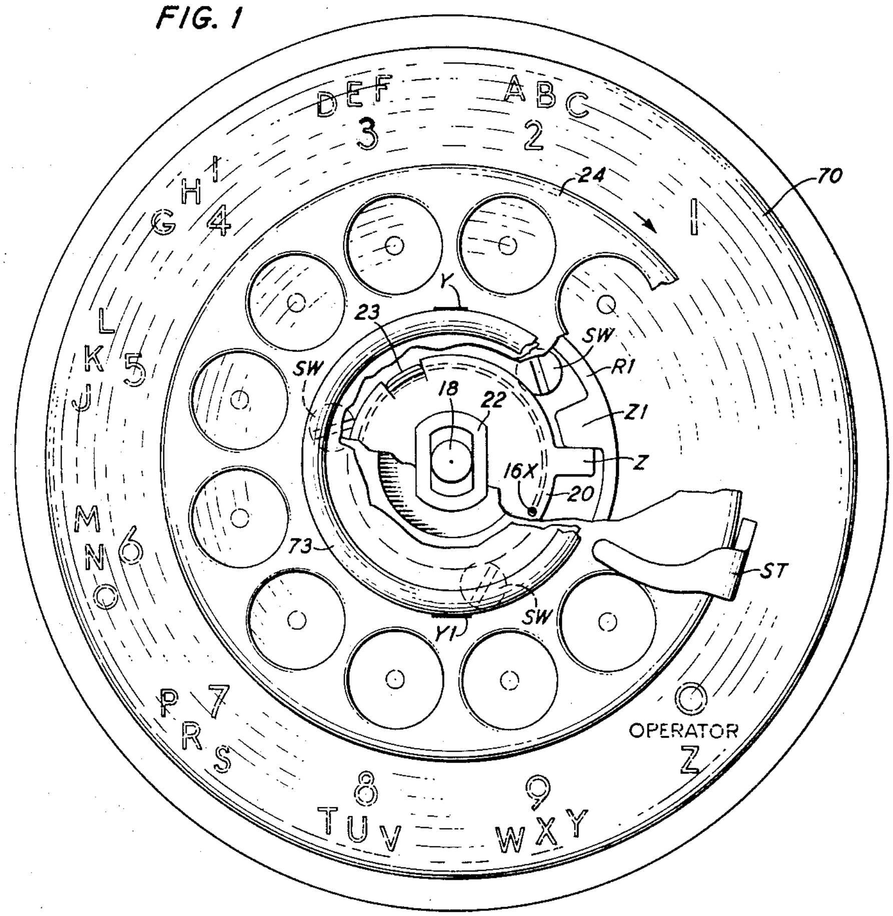
Fig. 1 is a top assembly view shown with a number of operating parts with portions broken away.

According to the construction of the call transmitter of this invention a circular mounting plate in the form of a casting 10 is formed at its center portion with a hub element 11 extending perpendicularly from the bottom wall 12 of a cup-shaped recess to form therewith an annular space provided for receiving a helical motor spring 13, the hub 11 being reinforced at its base by a collar portion 14 having a number of equally spaced radially disposed notches 15, any one of which may be used for hooking a radially bent portion 16 of motor spring 13 so as to secure the desired tension adjustment of the spring for the operation of the call transmitter, as will be hereinafter described in detail.

Figure 4:
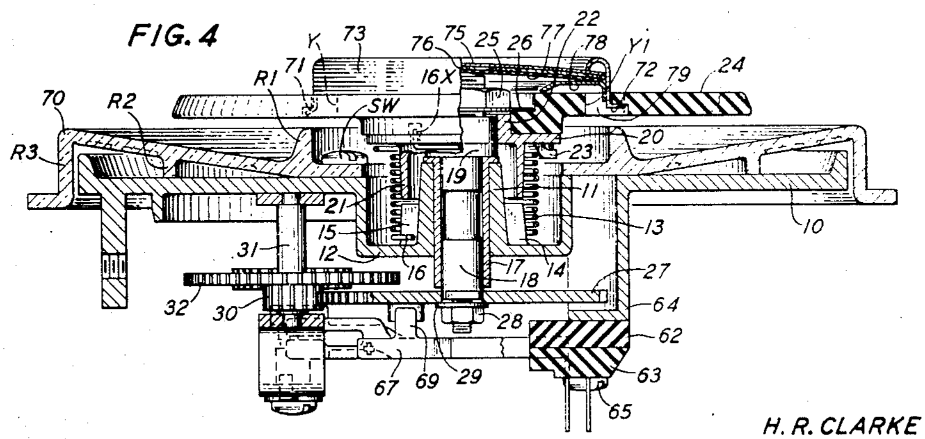
Fig. 4 is a vertical sectional view taken on line 4—4 of Fig. 2.
Figure 5:
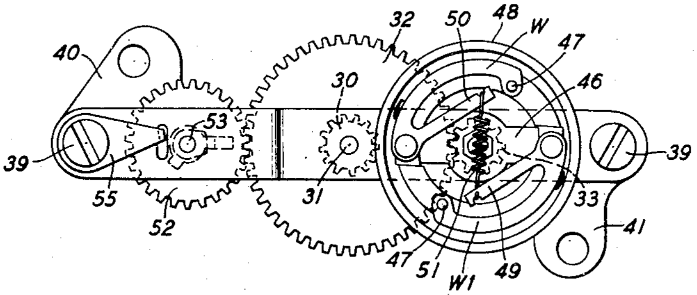
Fig. 5 is a rear view of a detail showing the gear train connecting the pulsing cam and governor mechanism in a unit assembly.

In the hub 11 is fitted a bushing 17 provided for receiving a shaft 18 having an enlarged portion 19 at its upper disposed end forming a shoulder portion resting on the flange of bushing 17 as best seen in Fig. 4. The enlarged portion 19 of shaft 18 is provided with two diametrically opposite flat surfaces for engagement with a similarly shaped opening in a projection 22 formed with a disc member 20. This disc has a downwardly extending cylindrical ridge portion 21 serving for holding this end of the motor spring 13 in concentric relation to the hub 11, while a drilled hole in the disc 20 is provided for receiving the opposite end 16X of motor spring 13 which is held in place by a lug 23 offset downwardly from the plane of disc 20 as best seen in Figs. 1 and 4. The applicants discovered that maximum torque was obtained from motor spring 13 when the end 16X of the spring was attached to the disc 20 so as to coincide with the position of pinion 30 when the first finger hold was in registry with the finger stop ST as when transmitting digit 1.

Figure 2:
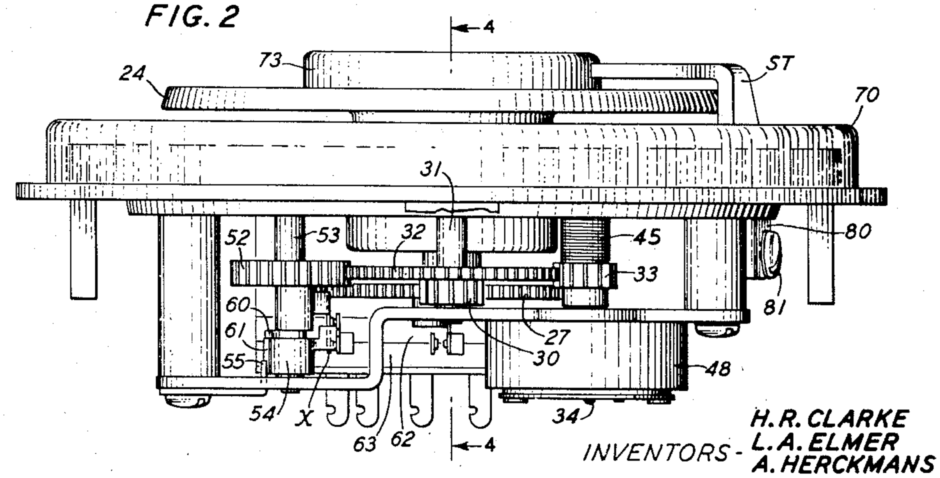
Fig. 2 is a side assembly view.
Figure 3:
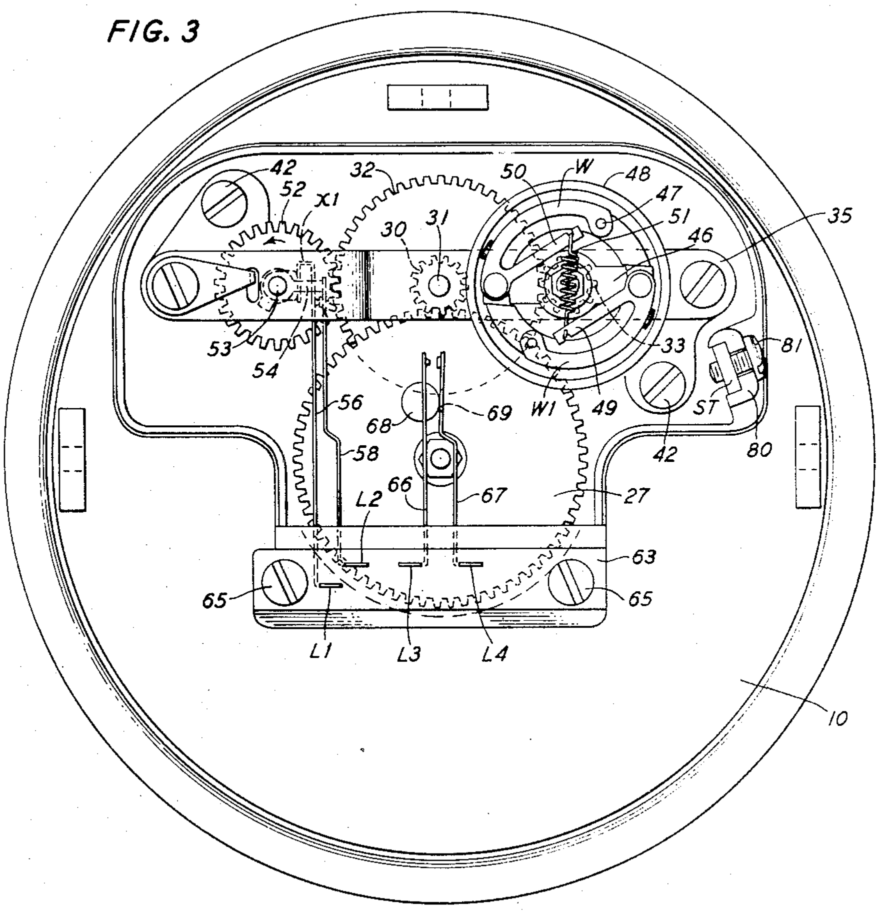
Fig. 3 is a rear view shown with the operating mechanism in normal position.

A finger wheel 24 is provided at its center portion with a substantially rectangular opening engaging the projection 22 of disc 20 while a nut 25 serves to collectively secure the finger wheel 24, disc 20 and a spring washer 26 to shaft 18. A radial projection Z, see Fig. 1, projects beyond the periphery of the disc 20 and cooperates with a radial extending portion Z1 formed integral with the rim R1 of the number plate 70 to readily locate the finger wheel 24 in its adjusted position relative to a finger stop ST secured to the mounting plate 10 in a manner which will be hereinafter described in detail. The opposite end of shaft 18 is formed with two diametrically disposed flat surfaces for receiving a similarly shaped opening in a gear 27, see Fig. 4, held securely in position thereon by a nut 28 and a washer 29. Gear 27, as shown in Figs. 2, 3 and 4, meshes with a pinion 30 formed with or keyed on a shaft 31 for rotation as a unit with a gear 32. Gear 32 meshes with a pinion 33 best seen in Figs. 2, 3, 5 and 6 mounted for free rotation on a shaft 34 journaled at both ends in bearings in bridge pieces 35 and 36 which are held in spaced relation to each other by a pair of spacer members 37 and 38 and screws 39, the bridge piece 36 having offset portions 40 and 41 serving for removably securing the unit thus formed to the mounting plate 10 as by screws 42.

Figure 6:
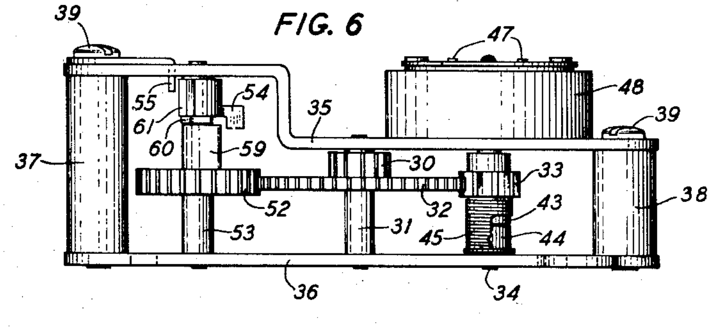
Fig. 6 is a side view of the unit shown in Fig. 5.

Pinion 33 is formed with a cylindrical portion 43, see Fig. 6, which cooperates with a cylindrical portion 44 formed with or keyed on shaft 34 and a coiled spring 45 to form a one-way effective clutch for operating the shaft 34. One end of this shaft projects from the bridge piece 35 for securely mounting a yoke-shaped member 46, best seen in Figs. 3 and 5, each arm of which is provided with a laterally disposed stud 47 serving for pivotally receiving the fly-weights W and W1 movable by centrifugal force upon the rotation of shaft 34 for frictionally engaging the inner disposed peripheral surface of a drum 48 securely mounted on the bridge piece 35 for controlling the operation of a pulsing mechanism when actuated by the tension of the motor spring. The fly-weights W and W1 are provided with inwardly extending arms 49 and 50 which are notched at their ends to receive the ends of a retractile spring 51 and permits the tension on the fly-weights W and W1 to be adjusted by bending these arms so as to increase or decrease the spring tension as desired.

Figure 10:
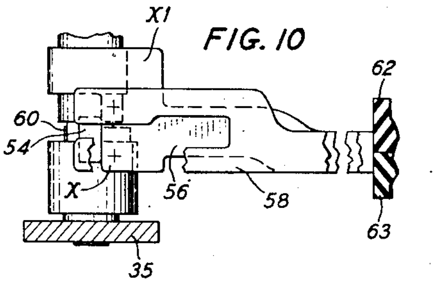

Gear 32 also meshes with a pinion 52 formed with a shaft 53 constructed of a non-metallic material, such as nylon, journaled in bridge pieces 35 and 36 and on this shaft is mounted for rotation thereon by friction, as will be hereinafter described in detail, an arm 54 of insulating material, such as nylon, movable with shaft 53 in one direction an angular distance determined by the engagement of a ridge 61 formed with the hub of this arm with a stop 55 adjustably secured on the bridge piece 35 by screw 39 and in the opposite direction of rotation of shaft 53 by the engagement of arm 54 itself with an abutment afforded by the duplex end $x$, Figs. 2, 7, 8, 9 and 10, of a contact spring 56 which in turn cooperates with a contact spring 58 to form a so-called pulsing contact P—P1. Contact spring 56, as best seen in Fig. 10, is offset from its secured end on a support which will be hereinafter described in detail and the portion $x1$ of this spring bent back upon itself for engaging a cam 59 preferably formed integrally with shaft 53. According to this construction the positioning of the contacts P and P1 at a point between their support 64 and cam 59 the so-called "Chatter" of the contacts has been effectively prevented resulting in more accurate break and make operation of the pulsing mechanism.

Rotational movement is imparted to the arm 54 in conjunction with its supporting shaft 53 by a substantially V-shaped spring 60, straddling a reduced portion of the projection 61 and its free ends projecting beyond the center of shaft 53 as best seen in Figs. 2, 6, 7, 8, 9 and 10 for engaging the latter with a predetermined tension. The pulsing springs 56 and 58 terminate at one of their ends as above mentioned in the form of duplex prongs having cooperating contact points P and P1 while the opposite end of contact springs 56 and 58, as best seen in Figs. 3 and 4, are held securely in parallel assembled relation to each other and spring 56 in relation to its actuating pulsing cam 59 by two clamping plates 62 and 63 of insulating material, in turn held securely on a base 64 formed with casting 10 by the tightening action of screws 65. Similarly, a pair of parallelly disposed springs 66 and 67 are clamped between the plates 62 and 63 and extend therefrom for operation by a stud 68, see Figs. 3 and 4, of insulating material carried by gear 27 engaging a lug portion 69 formed with spring 67 to perform a function well known in the telephone art and which forms no part of the present invention, the contact springs 56, 58, and springs 66 and 67 being formed with lugs at L1, L2, L3 and L4, respectively, protruding from the plate 63 for connection with the telephone apparatus not shown.

The number plate 70 which is constructed of transparent material, for example Lucite, is formed with a concavo-convex cross-section and is provided at its under-disposed or convex side with concentrically disposed reinforcing rim portions R2 and R3, and at its concave side with a rim R1, the rim portions R2 and R3 forming with the under-side of the plate 70 an annular channel or groove in which groups of letters and digits or other indicia are located in angular spaced relation to each other and in radial relation with the finger holds of the finger wheel 24. The groups of letters and digits are formed or produced in the casting of the number plate by a mold having in relief the groups of letters and digits to be reproduced as cavities in the number plate, such cavities being filled with a white paint, and the under surface of the annular recess painted black, for example, which colors have been found in actual use to produce a suitable contrasting effect, the annular groove formed by ridges R2 and R3 being disposed concentric to and beyond the peripheral edge of the finger wheel 24, thus effectively avoiding the eclipsing of the indicia or the casting of shadows on the number plate from the finger wheel.

The circular mounting plate 10 is formed with a downwardly extending projection 80, best seen in Figs. 2 and 3, and a rectangularly-shaped opening registering with a similarly shaped opening in the number plate 70 for receiving the securing portion of a finger-stop ST held in place as by a screw 81, the finger stop ST thus cooperating with the registering openings in the mounting plate 10 and in the number plate 70 to readily locate the latter in adjusted position relative to the finger wheel 24 preliminary to the securing of the number plate on the casing 10 as by a plurality of screws SW, best seen in Figs. 1 and 4.

The finger wheel 24 is provided with two diametrically opposite rectangular openings Y and Y1 having shoulder portions as best seen in Fig. 4 engaged by prongs 71 and 72 projecting from the edge of a cylindrically-shaped card holder 73 for holding the latter hooked to the finger wheel 24, this card holder having a downwardly turned edge for holding a disc member 75 of transparent material, an instruction card 76, a metal disc 77 and a supporting ring 78 of resilient material having its inner disposed peripheral edge bearing against the finger wheel 24 and its outer disposed peripheral edge against the metallic disc 77, resilient ring 78 having diametrically opposite lug portions 79 fitted in the openings Y and Y1 of the finger wheel so as to prevent relative movement of the elements in the assembly thus formed relative to the card holder 73 and therefore relative to the finger wheel, while reinforcing the prongs 71 and 72 against a force tending to flex these prongs as for the removal of the card holder from the finger wheel.

In the operation of the call transmitter of this invention the manual operation of the finger wheel 24 in a clockwise direction from any one of the groups of letters or digits carried by the number plate 70 to the finger stop ST is effective to rotate the shaft 18 and thereby tension the motor spring 13. The rotation of gear 27 keyed on shaft 18 is imparted to pinion 30 and gear 32 keyed on shaft 31 and to pinions 33 and 52. Rotation of pinion 33 in this direction of rotation is ineffective to rotate the shaft 34 because of the unwinding of clutch spring 45 on drums 43 and 44. Upon the rotation of pinion 52 carried by shaft 53 and therefore the rotation of pulsing cam 59 in the direction indicated by the arrows in Figs. 3 and 7, that is, during the so-called selective movement of the finger wheel, the arm 54 is moved out of registering relation from the end portion of pulsing spring 58, the cam 59 at the time holding the pulsing spring 56 in the operated position and through the engagement of contact points P and P1, the contact spring 56 holding its associated contact spring 58 raised a small distance beyond the apex of arm 54 so that the arm 54 is rotated because of the frictional effect of spring 60 on shaft 53. Upon the continued movement of shaft 53 the ridge 61 of arm 54 abuts against the stop 55 while the continued rotation of cams 59 permits the collective operation of the now closed contact springs 56 and 58 until the finger of the operator reaches the stop ST projecting radially a small distance over the finger wheel 24. Upon the release of the finger wheel by the operator the pulsing mechanism is returned to non-operated or normal position by the tension of motor spring 13 but under control of the governor mechanism now connected to pinion 33 by the tightening effect of clutch spring 45 on drum 43 formed with this pinion and on drum 44 keyed on shaft 34 as above described.

Figure 7:
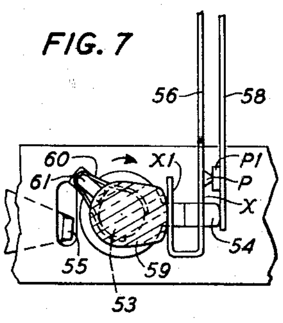
Figs. 7, 8, 9 and 10 are views of the pulsing cam and associated pulsing spring in different operated positions.
Figure 8:
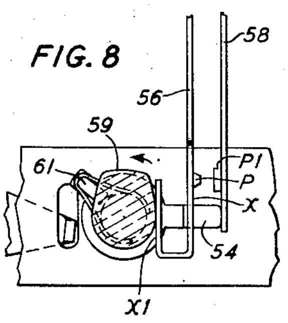
Figure 9:
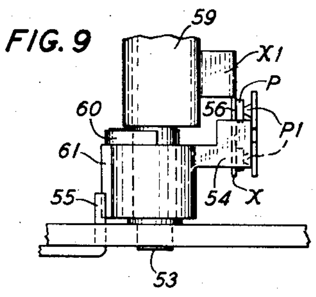

Rotation of shaft 53 in the direction opposite to that indicated by the arrow in Fig. 7, the cam 59 in its first turn in this direction collectively operates the closed contacts 56 and 58 through the contact points P and P1 thus permitting the arm 54 to move under the free end of contact 58 in abutment with the stop afforded by the end of the duplex arms $x$ formed with pulsing spring 56 preparatory to the second turn of cam 59 to cause the opening of the contacts P—P1 as indicated in Fig. 8 while the pulsing spring 58 is retained in its operated position by arm 54 but the pulsing spring 56 which is normally tensioned against the cam 59 follows the contour of this cam causing the first interruption of the telephone line by opening the contact P—P1, the negativing of the first turn of cam 59 being for the purpose of obtaining a given lapse of time in the fast successive dialing of digit 1, for example, so as to permit the proper operation of the so-called selector and connector switches at the telephone exchange under control of the transmitter.

Upon the return of the finger wheel 24 to its normal non-operated position the arm Z carried by disc member 20 on shaft 18 engages the stop Z1 carried by the number plate 70 and the transmitter is now ready for a succeeding operation.

The concave side of the number plate 70 from which the indicia are visually observed facilitates the selection of the desired symbol, while the location of such symbols in a circular row concentric and beyond the peripheral edge of the finger wheel effectively prevents shadows from the finger wheel reaching and obstructing the symbols carried by the number plate.

What is claimed is:

1. A call transmitter comprising a circular mounting plate, a cylindrically-shaped emboss portion disposed centrally thereof, a hub portion formed concentrically to said emboss portion to form an annular space therebetween, a shaft mounted for rotation in said hub portion, a coiled motor spring fitted in the annular space between said emboss and said hub portions, a disc member keyed on one end of said shaft having means for securely receiving one end of said spring, means formed with said hub portion for securely receiving the opposite end of said spring, a finger wheel keyed on said disc member operably for tensioning said motor spring, a pulsing mechanism, including a cam operatively connected to said finger wheel, a pair of contact springs one of said springs in engagement with the surface of said cam for actuating collectively by the cam of said mechanism upon the manual operation of said finger wheel, for tensioning said motor spring, and a second cam rotatably mounted adjacent said first cam and frictionally actuated by said mechanism under the tension of said motor spring in position for preventing the operation of one of said springs during the operation of the other spring for transmitting the call.

2. A call transmitter comprising a circular mounting plate in the form of a casting having a hub portion formed centrally thereof, a shaft rotatably mounted in said hub portion, a finger wheel carried by said shaft, a finger stop secured to said mounting plate, a number plate of a larger diameter than that of said finger wheel and having a concavo-convex cross section secured to said mounting plate and having groups of symbols disposed beyond the peripheral edge of said finger wheel, a motor spring tensioned by the clockwise rotation of said finger wheel during the selective operation thereof relative to said symbols, a pulsing mechanism including a cam operatively connected to said finger wheel, a pair of contact springs, one of said springs in constant engagement with the surface of said cam for actuating collectively said contact springs, said cam actuated by the tension of said motor spring for transmitting a number of pulses corresponding to the selective movement of said finger wheel, and means to render the operation of said finger wheel during the tensioning of said spring ineffective relative to said pulsing mechanism.

3. A call transmitter comprising a mounting in the form of a casting, a hub portion carried by said mounting, a shaft rotatably fitted in said hub portion, a motor spring disposed in position concentric to said hub portion, a disc member keyed on one end of said shaft having means for securely receiving one end of said spring, means carried by said hub portion for receiving the opposite end of said spring, a finger wheel keyed on said disc member for tensioning said motor spring upon the rotation of said finger wheel, a number plate secured to said mounting, means carried by said number plate cooperating with means carried by said disc for limiting the movement of said finger wheel under the tension of said motor spring, a driving gear keyed on the opposite end of said shaft, a driven gear train mechanism comprising a plurality of pinions actuated by the driving gear keyed on said shaft, a pulsing cam operatively connected to and actuated by said gear mechanism, a pulsing contact, and a second cam rotatably mounted adjacent said first cam and operable upon the movement of said first cam to render the operation of the latter ineffective relative to said pulsing contact during the manual operation of said finger wheel, said friction means operating upon the movement of said cam following the reverse movement of said finger wheel by the tension of said motor spring to cause the operation of said contact by the rotation of said cam.

4. A call transmitter comprising a mounting, a shaft arranged for rotation on said mounting, a finger wheel and a gear keyed on said shaft, a number plate secured to said mounting, having a plurality of groups of letters and digits disposed in angular spaced relation to each other, a governor, a pulsing cam, a gear mechanism operatively connecting said governor and said cam to said shaft, a frame for said gear mechanism, said cam and said governor detachably secured to said mounting by threaded fastening means, pulsing springs secured to said mounting, one of said pulsing springs having means disposed in operable relation with said cam, means for limiting the operation of said finger wheel from any one of the groups of letters and numbers on said number plate in one direction, a motor spring tensioned by the operation of said wheel for rotating the latter in the opposite direction to cause the operation of said pulsing springs, and means carried by said shaft engaging means carried by said number plate for stopping the movement of said finger wheel following the operation of said pulsing springs by said cam under control of said governor.

5. A call transmitter of the finger-wheel type comprising, a number plate, a finger-wheel mounted above said number plate and in spaced relation thereto, said finger-wheel being substantially smaller in diameter than said number plate, said number plate having a concavo-convex cross section, the indicia on said number plate arranged in concentric rows which are concentric with the finger wheel, beyond the periphery of the finger wheel and in radial alignment with the holes in the finger wheel, said number plate secured to the mounting plate upon which the transmitter mechanism is mounted and which is operatively connected to said finger wheel.

HARRY R. CLARKE.
LLOYD A. ELMER.
ALFRED HERCKMANS.
ORVILLE L. WALTER.

REFERENCES CITED

The following references are of record in the file of this patent:

UNITED STATES PATENTS

| Number | Name | Date |
|---|---|---|
| 1,456,602 | Kaisling | May 29, 1923 |
| 1,501,281 | Ide | July 15, 1924 |
| 1,543,662 | Booth | June 30, 1925 |
| 1,556,906 | Blessing | Oct. 13, 1925 |
| 1,580,943 | Baker | Apr. 13, 1926 |
| 2,206,224 | Field | July 2, 1940 |
| 2,244,609 | Cosgrove | June 3, 1941 |
| 2,394,360 | Bosh | Feb. 5, 1946 |
| 2,448,647 | Wood | Sept. 7, 1948 |

FOREIGN PATENTS

| Number | Country | Date |
|---|---|---|
| 308,385 | Great Britain | Mar. 28, 1929 |